Dec. 14, 1971 J. M. LAPEYRE 3,626,551
SHRIMP PEELING MACHINE DRIVE MECHANISM
Filed Oct. 24, 1969 3 Sheets-Sheet 1

INVENTOR.
JAMES M. LAPEYRE
BY
Wilkinson, Mawhinney & Thibault
ATTORNEYS

Dec. 14, 1971   J. M. LAPEYRE   3,626,551
SHRIMP PEELING MACHINE DRIVE MECHANISM
Filed Oct. 24, 1969   3 Sheets-Sheet 2
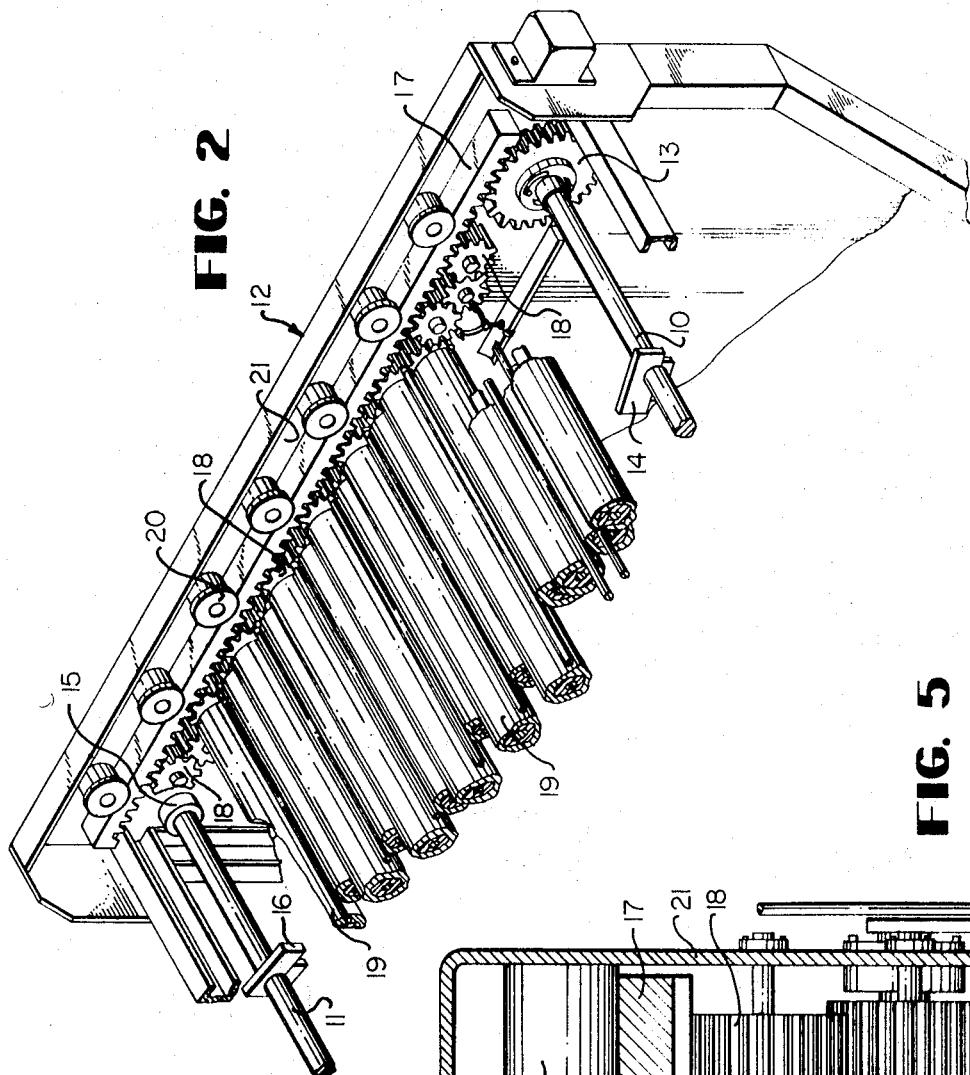
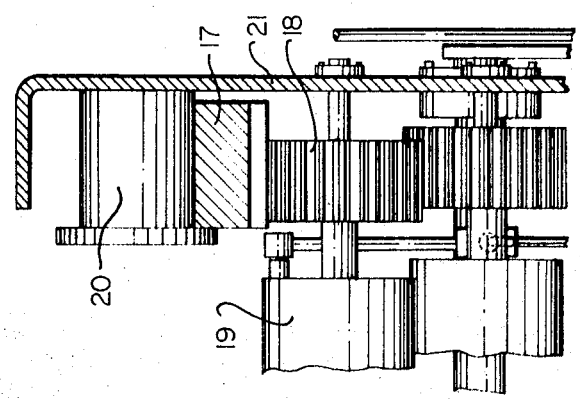
INVENTOR.
JAMES M. LAPEYRE
BY
ATTORNEYS Dec. 14, 1971   J. M. LAPEYRE   3,626,551
SHRIMP PEELING MACHINE DRIVE MECHANISM
Filed Oct. 24, 1969   3 Sheets-Sheet 3

INVENTORS
JAMES M. LAPEYRE

BY
Wilkinson Mawhinney & Thiebault
ATTORNEYS

United States Patent Office 3,626,551
Patented Dec. 14, 1971

3,626,551
SHRIMP PEELING MACHINE DRIVE
MECHANISM
James M. Lapeyre, New Orleans, La., assignor to The
Laitram Corporation, New Orleans, La.
Filed Oct. 24, 1969, Ser. No. 869,285
Int. Cl. A22c 29/00
U.S. Cl. 17—73
2 Claims

ABSTRACT OF THE DISCLOSURE

This disclosure is directed to driving the peeling rollers of a shrimp peeling machine and the pressure finger frames mounted thereover by a pitman arm actuated bell crank which rocks on cam shaft of a pair of cam shafts which raises and lowers the pressure finger frame and simultaneously drives the peeling rollers and the bell crank through a link drives a rocker arm which in turn oscillates the second cam shaft for raising and lowering the pressure finger frames.

The present invention is directed to an improved driving mechanism of inexpensive simplicity for shrimp peeling machines and being an improvement upon the driving mechanism shown and described in U.S. Pat. 2,778,055 particularly for driving a shrimp peeling machine wherein expensive parts have been eliminated and machine maintenance simplified and machine operation positively synchronized. I have eliminated one of two expensive cam shaft rocking gears and have made it possible to drive the oscillating peeling rollers with nylon pinion gears rather than an expensive brass rack driven gear for rocking the second cam shaft.

As shown in the drawings of Pat. 2,778,055 a pitman drive rocks one of a pair of cam shafts and with a head gear on the cam shaft a gear rack is reciprocated which imparts an oscillating drive to the power peeling rollers the last in line of which drives a head gear secured to impart rocking motion to the second cam shaft. Each cam shaft has secured thereon cams for raising and lowering pressure finger frames over the peeling roll sections of the machine. By simplifying this drive mechanism and removing costly parts the maintenance of a shrimp peeling machine having my improved drive is materially reduced.

With foregoing and other objects in view, the invention will be more fully described hereinafter, and will be more particularly pointed out in the claims appended hereto.

In the drawings wherein like symbols refer to like or corresponding parts throughout the several views.

FIG. 2 is a fragmentary perspective view with parts broken away and parts shown in section of a shrimp peeling machine taken from the front with the improved drive mechanism.

FIG. 5 is a vertical section taken on the lines 5—5 in FIG. 1.

Figure 1:
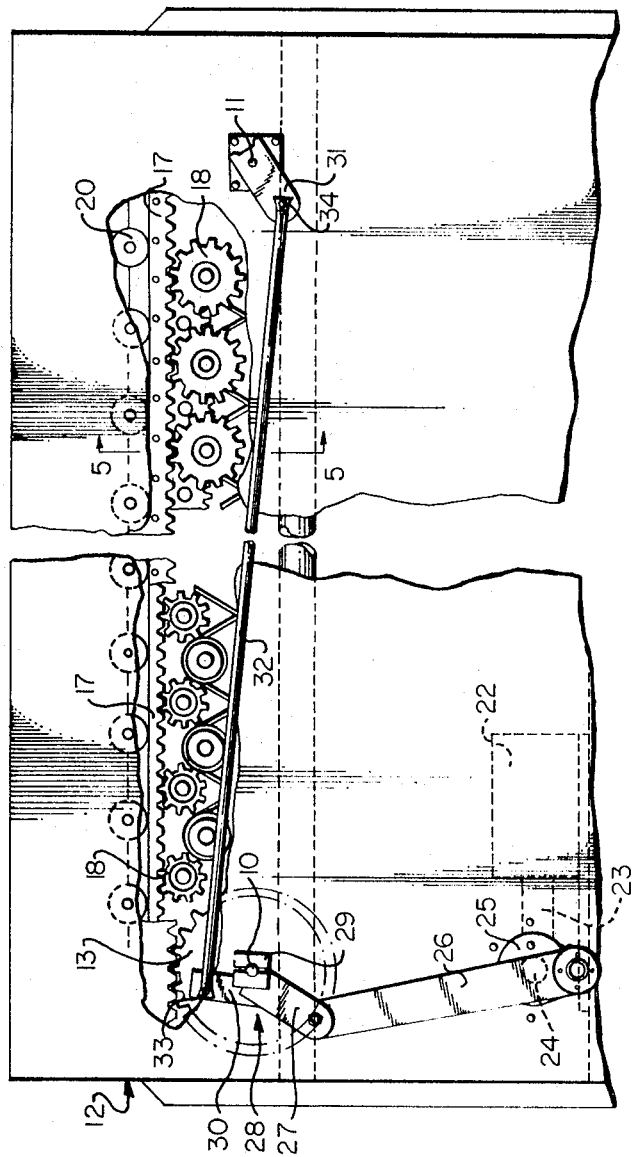
FIG. 1 is a rear elevational view with parts broken away showing the drive mechanism of the present invention installed on a shrimp peeling machine.

Referring now to the drawings 10 and 11 are two cam shafts journaled in the machine frame 12 for rocking movement. Cam shaft 10 has a head gear 13 secured for rocking movement therewith and has a pressure finger frame rocking cam 14 thereon. Cam shaft 11 is journaled at 15 in the machine frame for imparting rocking movement to finger frame rocking cam 16 as described for actuation of the pressure finger frames shown in detail in U.S. Pat. 2,778,055.

The head gear 13 has teeth which mesh with complemental teeth on a gear rack 17 to impart transverse reciprocation to the rack and in turn to oscillate pinions 18 which drive peeling rollers 19 of the machine. The gear rack 17 is back stopped by guide rollers 20 mounted on the back plate 21 of the machine.

Figure 3:
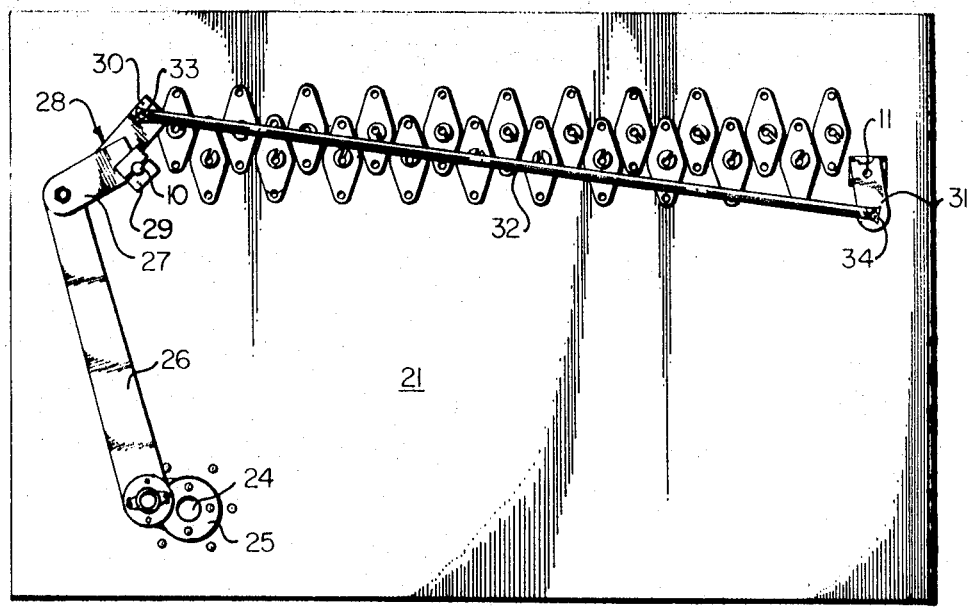
FIGS. 3 and 4 are rear elevational views of the shrimp peeling machine having the new drive mechanism thereon in two driving positions.
Figure 4:
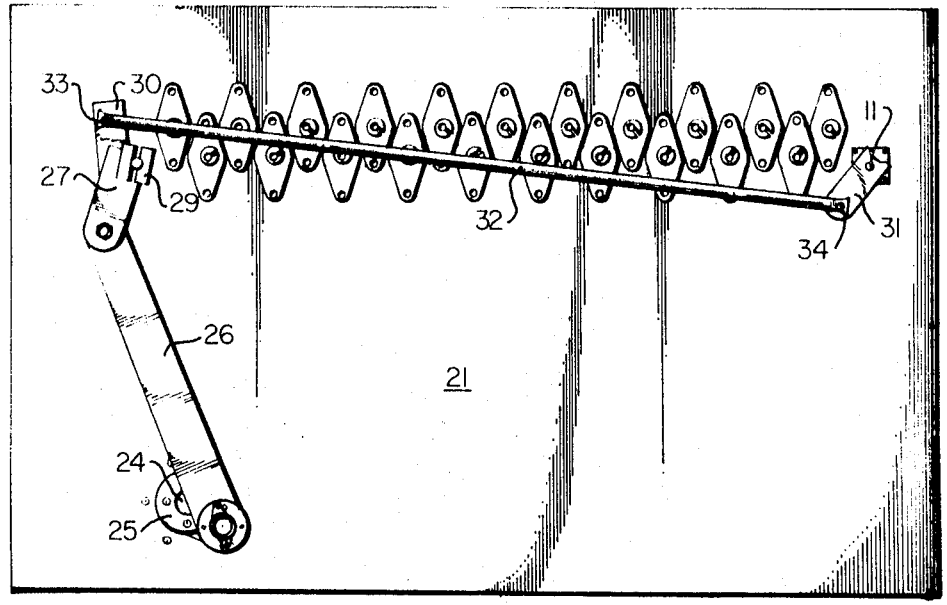

The machine drive mechanism is shown in FIG. 1 wherein an electric motor 22, through a gear reducer 23 drives shaft 24 having a hub 25 to which is pivotally connected the lower end of a pitman arm 26. The upper end of the pitman arm 26 has one arm 27 of a bell crank 28, the hub 29 of which is secured to cam shaft 10, while the other arm 30 of the bell crank 28 extends above the cam shaft 10. As best seen from FIGS. 3 and 4, rearwardly of plate 21, cam shaft 11 has secured thereto a rocker arm 31 to impart rocking motion to shaft 11. A link 32 is connected at one end to bell crank arm 30 at 33 while the other end of link 32 is pivotally connected to the free end of the rocker arm 31 at 34 whereby upon driving of the pitman arm 26 the shaft 10 is rocked by bell crank arm 27 causing both rocking movement of shaft 10 and reciprocation of gear rack 17 and its entrained pinions 18 to drive the peeling rollers 19.

The link 32 through its connection through rocker arm 31 will cause cam shaft 11 to oscillate to rock cams 16 which will vertically reciprocate the pressure finger frames shown in Pat. 2,778,055.

What I claim is:
1. In a shrimp peeling machine having oscillatable peeling rollers in geared driving relationship with a reciprocatable gear rack driven by a head gear mounted on a first rockable cam shaft of a pair of cam shafts for raising and lowering the pressure finger frames over the peeling rollers wherein the head gear carrying cam shaft is oscillated by a pitman arm driven by the output of a main motor, a drive mechanism comprising a first drive means adapted to be connected between the upper end of the pitman arm and said first cam shaft, a second drive means extending above said first cam shaft and connected thereto, a rocker arm adapted to be secured to said second cam shaft of said pair and extending below same, a link one end of which is adapted to be connected to said second drive means and the other end of which is adapted to be connected to the free end of the rocker arm carried by said second cam shaft.

2. A shrimp peeling machine drive mechanism as claimed in claim 1 wherein said first drive means is a long arm of a bell crank and the second drive means is the short arm of the same bell crank, said bell crank being secured to said first cam shaft to impart a rocking motion thereto.

References Cited
UNITED STATES PATENTS
2,778,055 1/1957 Lapeyre et al. _____ 17—73
3,307,583 3/1967 Harter _____ 74—96 X LUCIE H. LAUDENSLAGER, Primary Examiner U.S. Cl. X.R.
74—96